(No Model.)  3 Sheets—Sheet 1.

C. F. PARDEE.
CHAIN MACHINE.

No. 329,334.  Patented Oct. 27, 1885.

WITNESSES:
Chas. F. Schmelz
George W. Winsor.

INVENTOR:
Charles F. Pardee
per S. Scholfield
attorney (No Model.)  3 Sheets—Sheet 2.
C. F. PARDEE.
CHAIN MACHINE.
No. 329,334. Patented Oct. 27, 1885.
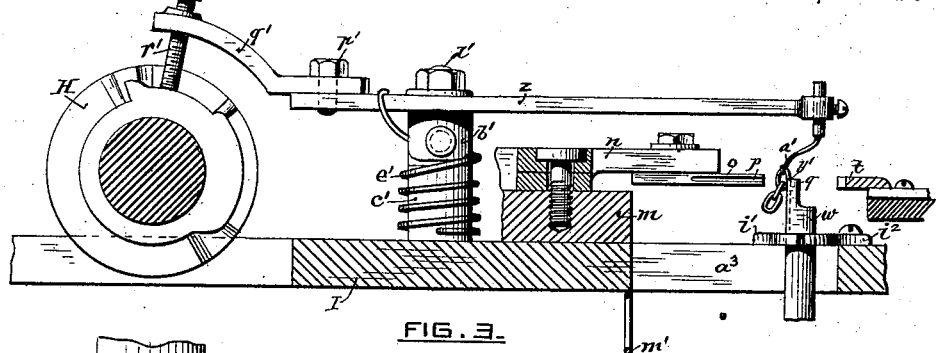
FIG. 3.
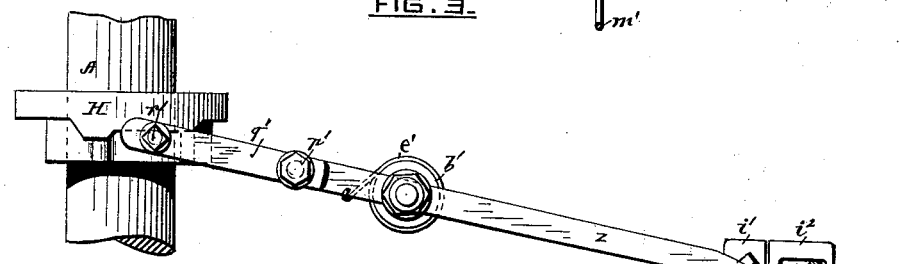
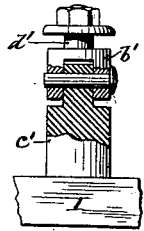
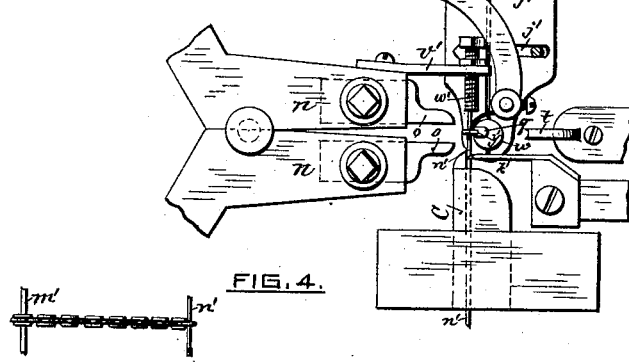
FIG. 15.   FIG. 4.
FIG. 16.
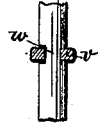
FIG. 17.
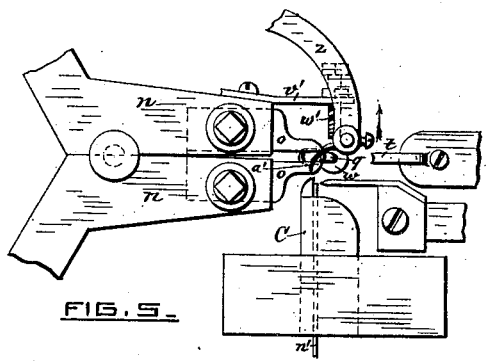
FIG. 5.
FIG. 18.
WITNESSES:
Chas. F. Schmelz
George W. Winsor
INVENTOR:
Charles F. Pardee
per. S. Scholfield
attorney
N. PETERS, Photo-Lithographer, Washington, D.C.

(No Model.)  
C. F. PARDEE.  
CHAIN MACHINE.  
3 Sheets—Sheet 3.

No. 329,334. Patented Oct. 27, 1885.

WITNESSES:  
Chas. F. Schmelz  
George W. Winsor

INVENTOR:  
Charles F. Pardee  
per S. Scholfield  
attorney

UNITED STATES PATENT OFFICE.

CHARLES F. PARDEE, OF NORTH ATTLEBOROUGH, MASSACHUSETTS, ASSIGNOR TO G. W. CHEEVER & CO., OF SAME PLACE.

CHAIN-MACHINE.

SPECIFICATION forming part of Letters Patent No. 329,334, dated October 27, 1885.

Application filed July 23, 1885. Serial No. 172,480. (No model.)

*To all whom it may concern:*

Be it known that I, CHARLES F. PARDEE, of North Attleborough, in the county of Bristol and State of Massachusetts, have invented an Improvement in Chain-Making Machines, of which the following is a specification.

My invention has reference to machines for making chains automatically without hand-labor; and it consists in the improved construction and arrangement of specific parts, by means of which a chain is made from one continuous coil of wire, as hereinafter set forth.

Figure 1:
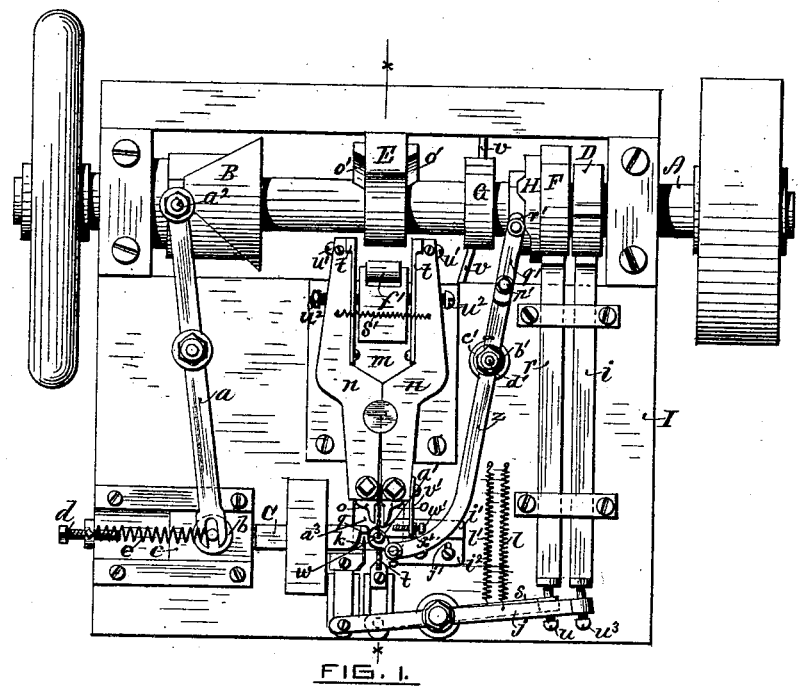
Figure 2:
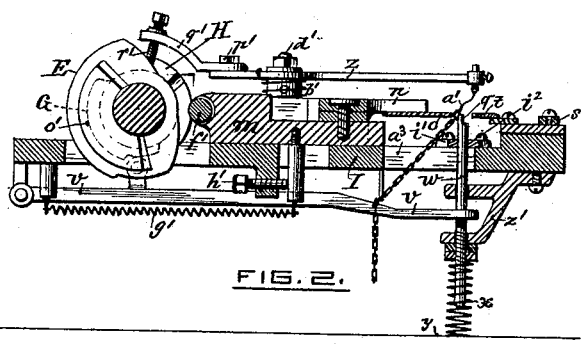
Figure 6:
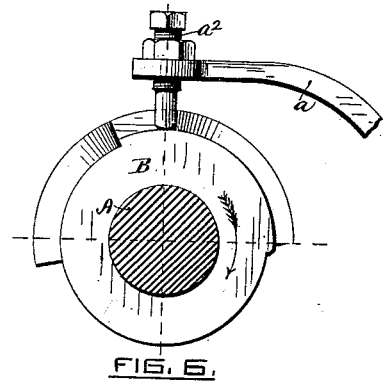
Figure 8:
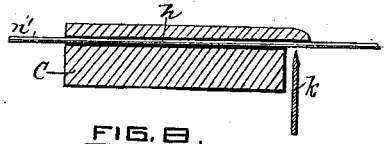
Figure 7:
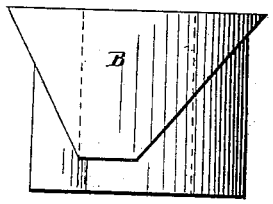

Figure 1 is a plan view of my improved chain-making machine. Fig. 2 is a vertical section of the machine, taken in the line $x\,x$ of Fig. 1. Figs. 3, 4, and 5 are detail views showing the operation of the link-holding hook. Figs. 6, 7, 9, 10, 11, 12, 13, and 14 are enlarged detail views of the several cams. Fig. 8 is an enlarged horizontal section of the stationary grooved or perforated guide employed for guiding the wire between the feeding devices and the cutter. Figs. 15, 16, 17, 18, and 19 are detail views of minor parts.

In the accompanying drawings, A is the driving-shaft, by means of which motion is imparted to all the mechanisms forming the machine. B is a cam secured to the shaft A, and arranged to operate the lever $a$, a side elevation and edge view of the cam being shown in Figs. 6 and 7. This cam in its rotation first raises the adjacent end of the lever $a$, thus depressing the other end so as to hold the wire firmly between the disk $b$ and the sliding piece $c$. To vary the pressure and regulate the distance according to the size of the wire, the adjusting-screw $a^2$ is secured to the lever $a$ with its point resting on the cam. The succeeding movement of the cam serves to feed the wire forward to the cutter, and in order to regulate the length of wire the screw $d$ is arranged to form an adjustable stop, against which the sliding piece $c$ rests, so that any desired length of wire can be fed within the limit of the lateral throw of the cam B. After the proper length of wire to form a link has been separated by the cutter, the lever $a$ is raised from the disk $b$, and thereupon the disk $b$ and sliding piece $c$ will be carried backward to contact with the adjustable stop $d$ by means of the coiled spring $e$. The portion of the wire which extends from the disk $b$ to the cutter $k$ is held in the guiding groove or perforation $h$ of the stationary piece C. (Shown in Fig. 8.) The cam D imparts reciprocating motion to the sliding bar $i$, and through the same to the pivoted lever $j$, to the outer end of which the cutter $k$, arranged to slide in suitable guides, is secured, and which is held against the sliding bar $i$ and cam D by means of the coiled spring $l$, so that when the wire is properly fed to the machine the cutter will separate the length projecting, as is shown enlarged in Fig. 4, a separate side view of the cam being shown in Fig. 14. The cam E in its rotation forces the sliding head $m$ outward, and to this sliding head are secured the opposing pivoted levers $n\,n$, to the outer ends of which are attached the removable jaws $o\,o$, which are provided on their adjacent faces with a longitudinal groove, $p$, adapted to retain the wire employed to form the link. The sliding head $m$ is provided with a friction-roll, $f'$, which is held in contact with the face of the cam E by means of the coiled spring $g'$ at the under side of the table I, and the movement of the sliding head is adjusted by means of the screw $h'$. The levers $n\,n$ are held in contact with the sides of the cam by means of the coiled spring $s'$, which is attached to the adjacent arms of the levers, and the proper movement of the levers $n\,n$ is adjusted by means of the bearing-plates $t\,t$ and adjusting-screws $u'\,u'$ and $u^2\,u^2$.

The cam E is so constructed as to first carry the sliding head and pivoted jaws forward, then to close the jaws upon the former $q$, after which, upon the depression of the former, the sliding head and pivoted jaws are retracted for a certain distance. The jaws are then opened and further retracted to the first-mentioned position. To the side of the outer end of one of the levers $n$, opposite to the cutter $k$, is attached the spring-arm $v'$, at the outer end of which is inserted the screw $w'$, which is securely held in proper position by means of the check-nut $x'$. The end of the screw $w'$, in conjunction with the cutter $k$, serves to hold the separated wire in proper position for the primary action of the jaws $o\,o$ in bending the wire around the former $q$. The cam F, which is similar in construction to the cam D, operates the sliding bar $r$, and through this the pivoted lever $s$, to the other end of which the swage $t$, arranged to slide in suitable guides, is secured, so that when the link is partially formed between the grooved jaws $o$ $o$, which at their forward position embrace the former $q$, the swage $t$ will be brought forward against the ends of the wire to completely clinch or close the link. The pivoted lever $s$ is held against the sliding bar $r$, and this against the cam F, by means of the coiled spring $l'$. The motion of the swage $t$ can be accurately adjusted by means of the screw $u$, and the motion of the cutter $k$ by means of the adjusting-screw $u^3$.

Figure 9:
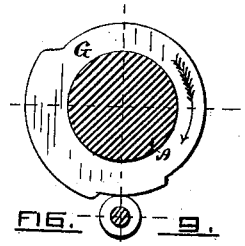
Figure 10:
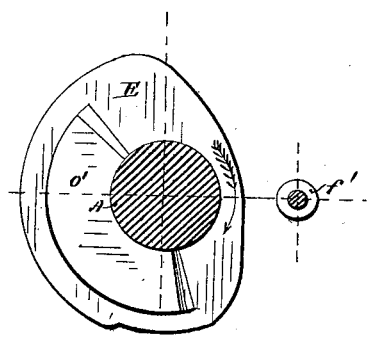
Figure 12:
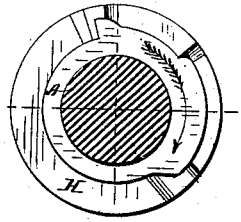
Figure 11:
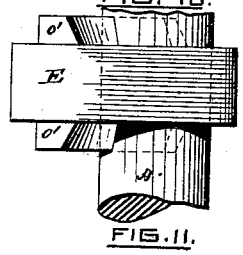
Figure 13:
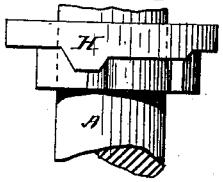
Figure 14:
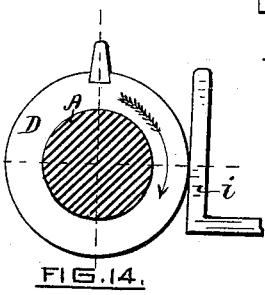

G is a cam secured to the shaft A, and adapted to operate the pivoted lever $v$, to the outer end of which is connected the vertical spindle $w$. At the upper end of the spindle is located the former $q$, around which the wire is bent to form the link, and which is provided with a vertical groove, $y'$, on the side next to the jaws. The outer end of the lever $v$ is provided with a slot, as shown in Fig. 16, and is made to loosely embrace the spindle at a flattened portion thereof, as shown in Fig. 17. The lever $v$ is held against the cam by means of the upwardly-acting coiled spring $x$, which extends downward from the lower end of the spindle $w$ to a fixed point of support, $y$. The spindle $w$ is loosely held in a hanger, $z'$, which is adjustably secured to the lower side of the table I, and the upper end of the spindle above the table is held between the jaws $i'$ $i^2$, which are held to the table by means of suitable screws, the jaw $i^2$ being provided with slots $j'$, in order that the jaws may be adjusted to embrace a spindle of elongated cross-section when forming elongated chain-links upon the machine. An enlarged side elevation of the cam G is shown in Fig. 9. The cam H in its rotation imparts both horizontal and vertical motion to the pivoted lever $z$, to the outer end of which is secured the downwardly-projecting hook $a'$, by means of which the newly-formed links are properly manipulated in timely relation to the movements of the link-forming devices. The lever $z$ is pivoted upon a stud, $b'$, (shown enlarged in Fig. 3 and in partial section in Fig. 15,) which is jointed to a fixed stud, $c'$, so that the lever $z$ will be made capable of an up and down movement in the direction of its length, and be at the same time capable of receiving a horizontal movement upon its pivot $d'$. The lever $z$ is held against the face of the cam by means of the coiled spring $e'$, which encircles the stud $c'$, and at its upper end bears both horizontally and in a downward direction against the lever $z$. The hook $a'$ is adjusted to its proper working elevation by means of the screw $r'$, and the proper horizontal position of the hook is regulated by laterally moving the extension-piece $q'$ of the lever $z$, which is secured to the pivoted portion of the lever by means of the screw $p'$.

The operation of the machine is as follows: A suitable coil of wire of the desired dimension and sectional shape is placed near the machine, and arranged so that it can unwind automatically. The end of the wire is passed through or between a suitable friction device, as is usual, to retain the wire and straighten the same. It is now passed between the holding-disk $b$ and the sliding piece $c$, and thence through the groove or perforation $h$ in the piece C to the cutter $k$. The machine may now be started, and the desired length of wire to form the link will be fed by the disk $b$, operated through the lever $a$ by means of the cam B. The wire beyond the disk $b$ is held in a properly-fitting groove or perforation, $h$, which serves to prevent the wire from bending when under the action of the cutter $k$, the forward end of the wire being caused to press against the end of the adjustable stop-gage screw $w'$. The forward movement of the cam D operates the cutter $k$, through the sliding bar $i$ and pivoted lever $j$, and by means of the cutter $k$ the required length of wire is cut off to form the link, which wire is then immediately held in proper position between the cutter $k$ and the end of the stop-gage screw $w'$. The former $q$ now rises with the spindle $w$, through the action of the lever $v$ and cam G, to a position immediately in front of the middle portion of the wire. The grooved jaws $o$ $o$ are then thrown forward by means of the cam E, causing the wire to be taken from between the cutter $k$ and the end of the screw $w'$ and bent to the form of a staple around the former $q$. The forward movement of the side pieces, $o'$ $o'$, of the cam E now causes a closing movement of the jaws $o$ $o$, thus bending the wire partially around the former, whereupon the cam F, acting upon the sliding bar $r$ and lever $s$, will cause the advance of the swage $t$ toward the adjacent side of the former $q$, and against the wire at the open end of the partially-formed link, thus closing the same around the former $q$ and completing the first link of the chain. The former $q$ is now drawn down by the lever $v$, operated upon by the cam G, leaving the finished link firmly held within the grooved jaws $o$ $o$, which jaws are now retracted by the action of the cam E to a proper distance from the axis of the former, as shown in Fig. 5, the center of the engaging-bend of the hook $a'$ being at this time located immediately over the center of the wire of one side of the horizontally-held link, as shown in Figs. 5 and 18. The action of the cam H now causes the hook $a'$ to be carried over the center of the link held in the jaws $o$ $o$, then downward through the opening of the link, and then back to its original vertical plane, thus bringing the hook centrally under the wire of one side of the link. The continued movement of the cam E now causes the opening of the jaws $o$ $o$, and the consequent release of the link, which drops immediately to the hook, and is thus suspended thereon. The link now being held on the hook is both below and to one side of the central position for forming the chain, and the further action of the cam H serves to elevate the hook and carry the same to the required central position, as shown in Fig. 4. The action of the cam G now causes the former $q$ to rise, so as to catch the wire of the front side of the link in the groove $y'$ of the former. The wire $n'$ is now again fed forward, but this time passing through the previously-formed link held on the hook $a'$, and guided by the groove $y'$ of the former $q$, and after reaching the face of the adjustable stop-gage $w'$ it is cut off by means of the cutter $k$, actuated by the cam F. The hook $a'$ is then lowered and drawn to one side, so as to release the link, the groove $y'$ serving to retain the link in proper position on the wire while the hook is being withdrawn. The hook is then raised and carried over to its position shown in Fig. 5 preparatory to engagement with the succeeding link of the chain. The former $q$ now rises to its full extent back of the wire and link, and a new link is thereafter formed from the wire by the continued operation of the machine, as above described for the first link, and the further continued operation of the machine will result in the production of a continuous length of chain of round, oval, or other shaped links, in which the links are set at right angles to each other, and a cable or other similar chain formed and made from one continuous length of wire around one and the same former, producing a chain perfect in all its links and more uniform than can be made by hand, requiring no hand-labor and but little supervision. Chains of any desired length or shape of link and of any desired size or section of wire may be automatically made on my improved machine. The chain is made to extend from the former $q$ obliquely downward to a horizontal guide-rest, $m'$, which may be secured to the under side of the table I at near the edge of the opening $a^3$ through which the chain passes. The position of the guide-rest $m'$ is to be so adjusted that when the last-formed link of the chain is properly held on the inserted wire to form an additional link the guide-rest will be located between two vertically-directed links, as shown in Fig. 19, which shows a vertical view of the chain extending from the wire $n'$ obliquely downward to the transversely-directed horizontal guide-rest $m'$. The chain will by this means be properly rotated when each additional link is joined thereto.

I claim as my invention—

1. In a machine for making chain, the combination of an intermittent feed mechanism and cutter, a reciprocating former, means for bending the wire around the former to form a link, and the hook adapted for the proper manipulation of the finished links to make a continuous chain, substantially as described.

2. In a machine for making chain, the combination of an intermittent feed mechanism and cutter, and an adjustable stop-gage for limiting the forward movement of the wire and for holding the same prior to bending, a reciprocating former, means for bending the wire around the former to form a link, and the hook adapted for the proper manipulation of the finished links to make a continuous chain, substantially as described.

3. In a machine for making chain, the combination of an intermittent feed mechanism and cutter, a reciprocating former, grooved jaws having a forward and backward and closing and opening movement, reciprocating swage for closing the open end of the link upon the former, and the hook adapted for the manipulation of the finished links to make a continuous chain, substantially as described.

4. In a machine for making chain, the combination of the reciprocating former, means for bending the wire around the former to form a link, the hook adapted to receive the finished link from the wire-bending means, and the guide-rest adapted to secure the proper revolution and alignment of the finished chain, substantially as described.

5. In a machine for making chain, the combination of the reciprocating former, means for bending the wire around the former to form a link, and the hook adapted to receive the finished link from the wire-bending means, substantially as described.

CHARLES F. PARDEE.

Witnesses:
GEO. W. CHEEVER,
LAURA BUNKER.